(12) United States Patent
Sloan (10) Patent No.: US 8,930,389 B2
(45) Date of Patent: Jan. 6, 2015

(54) MUTUAL SEARCH AND ALERT BETWEEN STRUCTURED AND UNSTRUCTURED DATA STORES

(75) Inventor: David Mordechai Sloan, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 12/574,660

(22) Filed: Oct. 6, 2009

(65) Prior Publication Data

US 2011/0082873 A1 Apr. 7, 2011

(51) Int. Cl.
G06F 17/30 (2006.01)
(52) U.S. Cl.
CPC .................................. *G06F 17/30979* (2013.01)
USPC .......................................................... 707/765
(58) Field of Classification Search
CPC ..................... G06F 17/30864; G06F 17/30867; G06F 17/30; G06F 17/30448
See application file for complete search history.

(56) References Cited

U.S. PATENT DOCUMENTS

| | | | | |
|---|---|---|---|---|
| 7,426,499 B2 * | 9/2008 | Eder | ............................... | 706/20 |
| 2005/0076003 A1 * | 4/2005 | DuBose et al. | .................... | 707/1 |
| 2005/0197828 A1 * | 9/2005 | McConnell et al. | ............... | 704/9 |
| 2005/0283473 A1 * | 12/2005 | Rousso et al. | ..................... | 707/5 |
| 2006/0053096 A1 * | 3/2006 | Subramanian et al. | ........... | 707/3 |
| 2006/0095345 A1 * | 5/2006 | Ka et al. | ........................... | 705/27 |
| 2006/0101017 A1 | 5/2006 | Eder | | |
| 2008/0243784 A1 * | 10/2008 | Stading | ............................ | 707/3 |
| 2008/0295101 A1 | 11/2008 | Vicars et al. | .................. | 718/102 |

FOREIGN PATENT DOCUMENTS

| | | |
|---|---|---|
| JP | 2000020537 | 1/2000 |
| JP | 2004133510 | 4/2004 |
| JP | 2006500075 | 1/2006 |
| JP | 2006155275 | 6/2006 |
| JP | 2007140721 | 6/2007 |
| JP | 2007257083 | 10/2007 |
| JP | 2007287169 | 11/2007 |
| WO | 2008063974 | 5/2008 |

OTHER PUBLICATIONS

Noble; "Fusion of Open Source Information"; INSPEC/IEEE; 8pp., 2005.
Rao; "From Unstructured Data to Actionable Intelligence"; INSPEC/IEEE; vol. 5, No. 6, pp. 29-35; Nov.-Dec. 2003.
Doan-et al.; "Information Extraction Challenges in Managing Unstructured Data"; ACM Digital Library; pp. 14-26; Dec. 2008.
Irmak-et al.; "Interactive Wrapper Generation with Minimal User Effort"; ACM Digital Library; pp. 553-565; May 23-26, 2006.

* cited by examiner

*Primary Examiner* — Dinku Gebresenbet
(74) *Attorney, Agent, or Firm* — VanLeeuwen & VanLeeuwen; Terrence J. Carroll (57) ABSTRACT

An approach is provided that search unstructured data sources with a search engine using initial search terms. Search hits received from the search engine are gathered and possible search terms are retrieved from the search hits. Entities are extracted from the search hits where the entities correspond to the extracted terms. The extracted entities and terms that are extracted are used to query structured data sources, such as tables in a relational database. Query results are then received from the queries performed on the structured data sources. These query results are used to further search the unstructured data sources to again receive search hits from which terms and entities are extracted. Search hits and the extracted entities are stored in a results data store for analysis.

17 Claims, 5 Drawing Sheets

MUTUAL SEARCH AND ALERT BETWEEN STRUCTURED AND UNSTRUCTURED DATA STORES

BACKGROUND OF THE INVENTION

1. Technical Field

The present invention relates to an approach for searching both structured and unstructured data sources in a fashion that finds commonalities between the sources and exploits such commonalities recursively.

2. Description of the Related Art

Information users, such as governmental organizations, corporations, and other private organizations, typically manage both unstructured and structured data sources. Some of these sources may be maintained in-house, while others may be maintained, and therefore controlled, by external entities. The structured and unstructured sources often have little or no synergy, linkage, or automatic notification between each other. Mining data between these disparate types of sources traditionally falls short. One approach is to index the structured sources, however this approach ignores logic that can be applied based on structured metadata. A second approach is extracting structured data from unstructured data, however automated extraction technology has been researched for many years and yields structured data of questionable quality.

SUMMARY

An approach is provided that search unstructured data sources with a search engine using initial search terms. Search hits received from the search engine are gathered and possible search terms are retrieved from the search hits. Entities are extracted from the search hits where the entities correspond to the extracted terms. The extracted entities and terms that are extracted are used to query structured data sources, such as tables in a relational database. Query results are then received from the queries performed on the structured data sources. These query results are used to further search the unstructured data sources to again receive search hits from which terms and entities are extracted. Search hits and the extracted entities are stored in a results data store for analysis.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
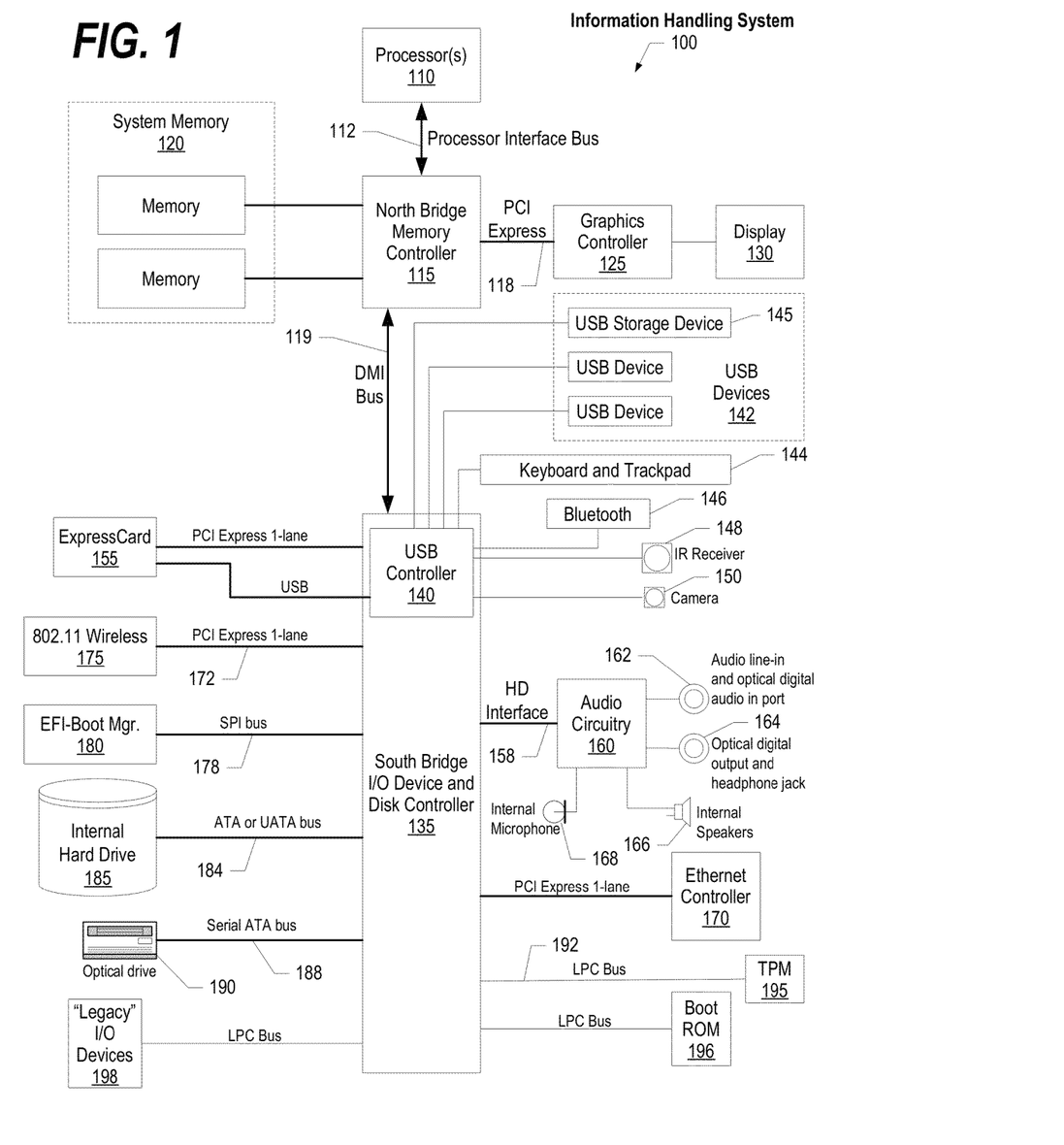
FIG. 1 is a block diagram of a data processing system in which the methods described herein can be implemented.
Figure 2:
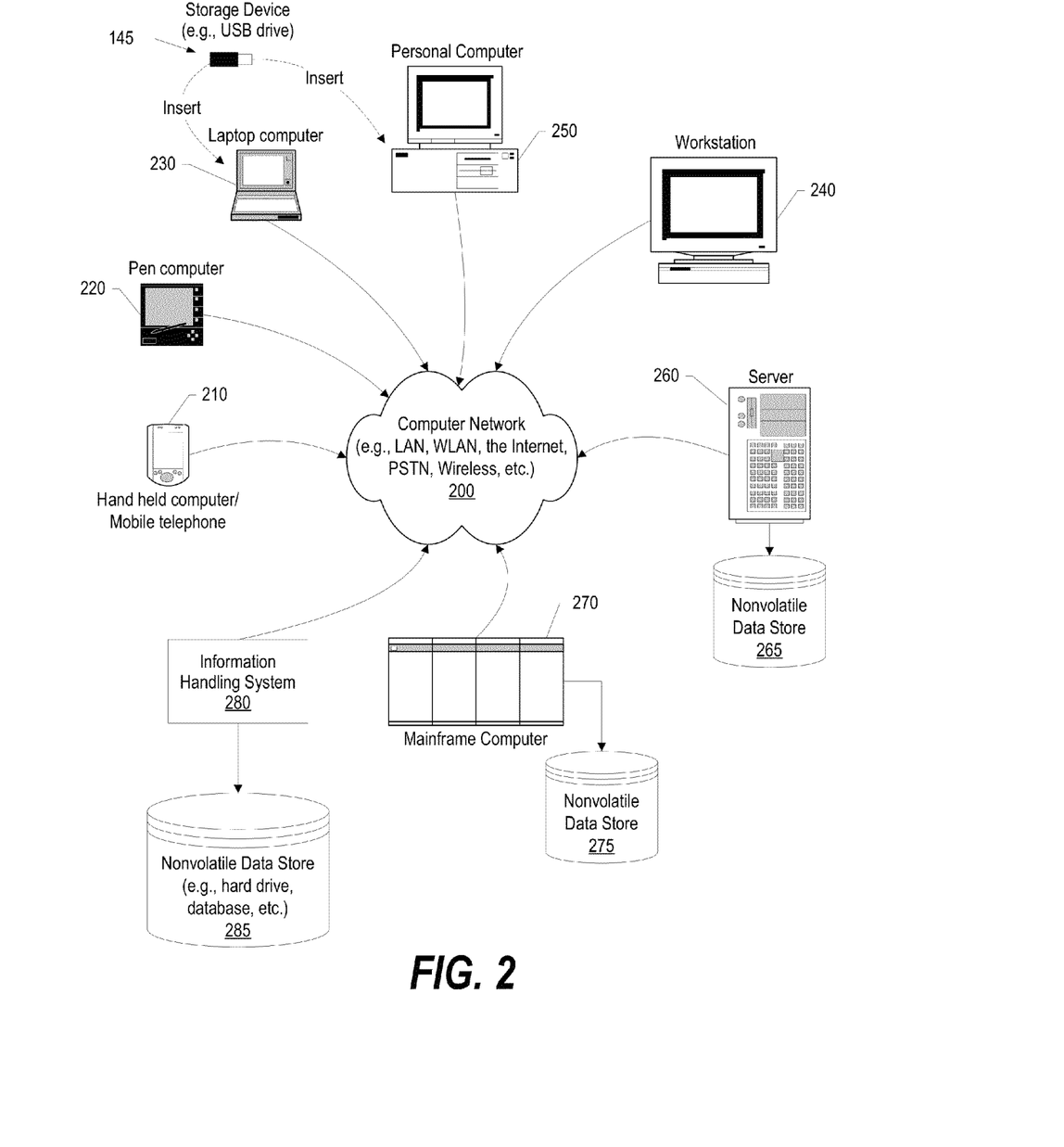
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/ mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
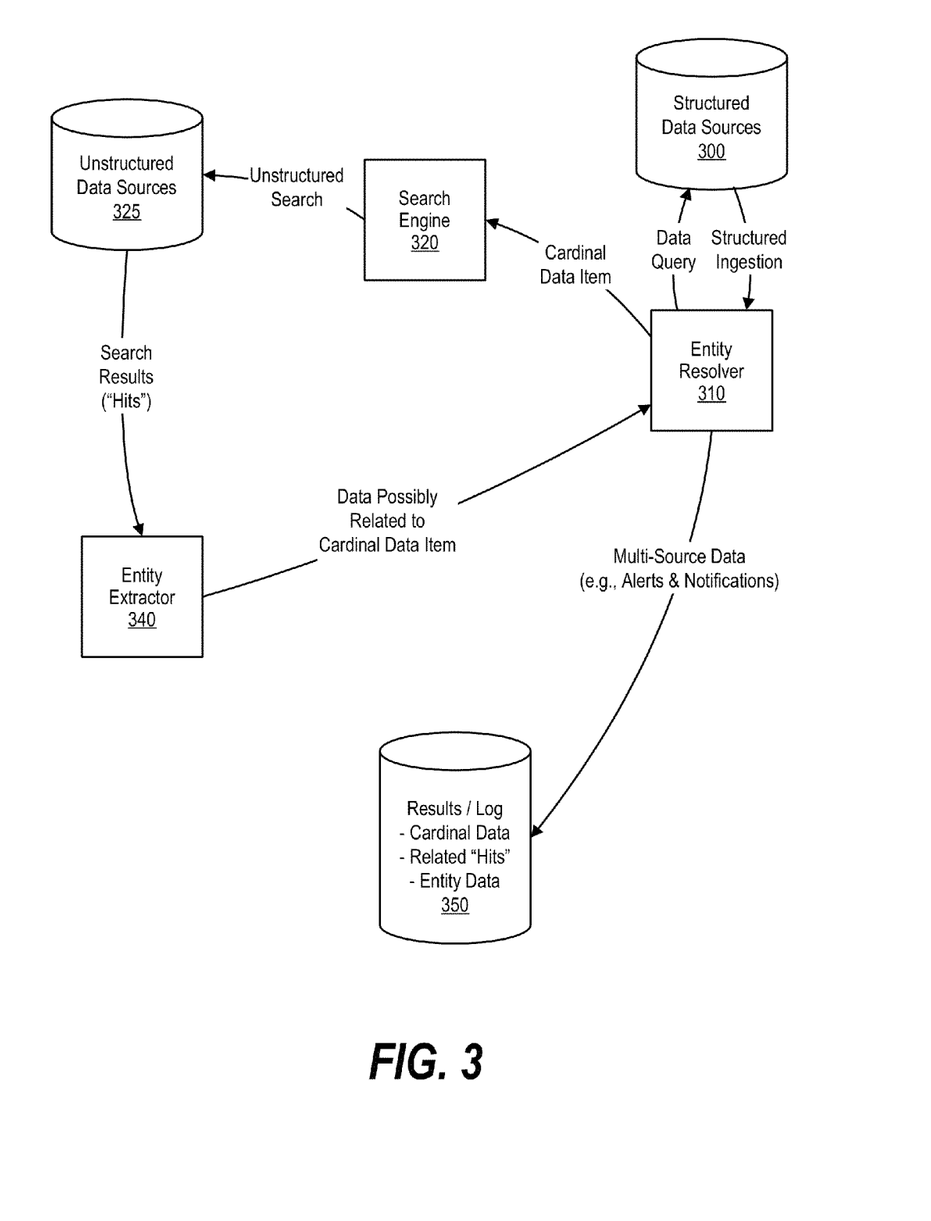
FIG. 3 is a diagram interaction between unstructured and structured data sources to retrieve data.

FIG. 3 is a diagram interaction between unstructured and structured data sources to retrieve data. Unstructured data sources 325 include both private data sources as well as publicly available data sources, such as those available on the Internet. Search engine 320, such as a publicly available search engine, is used to search the unstructured data sources. Initial terms are provided as search terms to the unstructured data sources. For example, in a law enforcement implementation, the initial terms might be the data gathered during an arrest, such as a suspect's name, date of birth, vehicle plate information, social security number, and other data gathered at the time of the arrest.

Entity extractor 340 is used to extract data from the search results ("hits") resulting from the search of the unstructured data sources. Entity extractors are commercially-available products that identify data "types" within an unstructured set of data. For example, an entity extractor might identify a piece of data ("term") within the unstructured search results as being a possible credit card number based upon the number of digits and format of the number. Another term might look like a "company name" while another term in the unstructured data might appear to be an address, a phone number, or any number of other data types.

The results of the entity extractor are data types that are passed to entity resolver 310. The entity resolver determines which structured data sources (e.g., database tables) this data type might map to and perform the appropriate queries against such structured data sources. For example, if the entity extractor identifies a term, such as a phone number, the entity resolver identifies structured data sources that have phone number fields and these fields are searched for the phone number extracted from the unstructured data source (e.g., "select*from [table_name] where phonenum=" [phone_num]—where table_name is the name of the identified structured database table, phonenum is the field within the table, and phone_num is the actual phone number (e.g., 202-555-1234) that was extracted from the unstructured data source).

Entity resolver 310 also identifies "cardinal" data items which are those data items that are non-common and non-generic. This cardinal data items and their respective entity types are the ones that are stored in results log 350. As shown, data stored in results log 350 include the identified cardinal data, the related "hits" from the unstructured data sources, and the entity data (data types, data from structured data sources). As shown, the process is recursive. The entity resolver identifies cardinal data items and these items (non-common, non-generic terms) are used by search engine 320 to search unstructured data sources 325. The resulting search "hits" (results) are then processed as described above. Being a recursive, iterative process, the processing shown in FIG. 3 can be repeated many times generating more and more results that are stored in results log 350.

Figure 4:
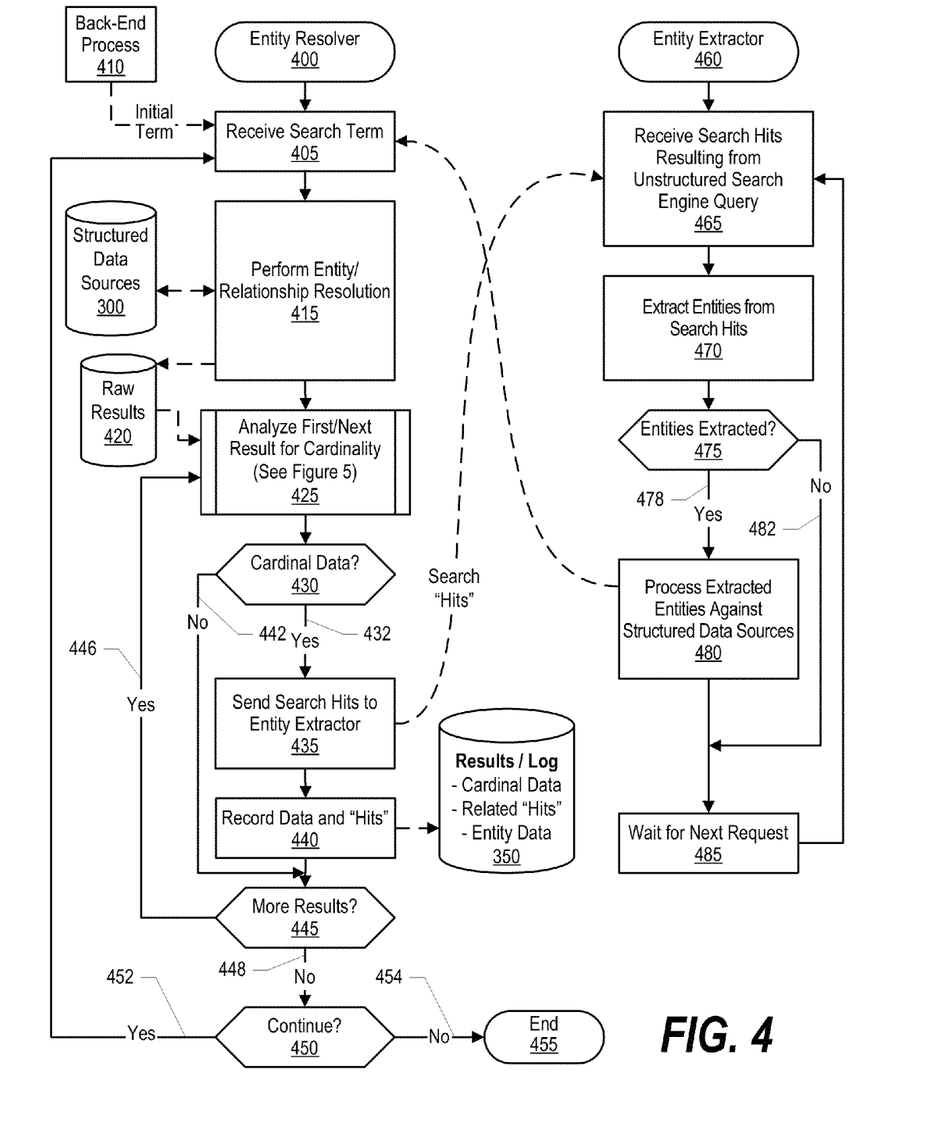
FIG. 4 is a flowchart showing steps performed by the entity resolver that performs entity relationships in structured sources and interaction with the entity extractor that extracts entities from unstructured data sources.

FIG. 4 is a flowchart showing steps performed by the entity resolver that performs entity relationships in structured sources and interaction with the entity extractor that extracts entities from unstructured data sources. Processing commences at 400 whereupon, at step 405 a search term is received. In the case of an initial inquiry, the search term might be received from backend process 410. Using the example introduced for FIG. 3, a backend process might be a booking process that is undertaken when a suspect is arrested and data is gathered regarding the suspect and the alleged offense.

At step 415, an entity relationship resolution process is performed in order to query structured data sources 300. The entity relationship resolution process includes identifying sources, such as database tables, within the structured data sources to search as well as the search fields to use as well as the term that is being queried. For example, using the above arrest record example, a table might be a previous arrest record table and a field might be a phone number fields where the process searches for other arrest records that match the same phone number. If other suspects have also used the same phone number, this phone number might be important in relating, or linking, the suspects to one another. At this point, however, the process does not infer the importance or relevance of particular piece of data. Instead, step 415 stores the query results in raw results 420. The results stored in raw results 420 are then analyzed for cardinality by predefined process 425 (see FIG. 5 and corresponding text for processing details regarding analysis for cardinality).

A determination is made as to whether, based on the analysis for cardinality, the data is indeed cardinal data (decision 430). If the data is cardinal data, then decision 430 branches to "yes" branch 432 whereupon, at step 435 the search hits resulting from the unstructured search performed during predefined process 425 are sent to entity extractor process 460 for further processing. In addition, at step 440, the cardinal data, entity data, and related search hits are stored in results data store 350. Returning to decision 430, if the analysis performed by predefined process 425 determines that the data is not cardinal data, then decision 430 branches to "no" branch 442 bypassing (skipping) steps 435 and 440 so that non-cardinal results are not stored in data store 350.

A determination is made as to whether there are more results in raw results data store 420 to process (decision 445). If there are more results to process, then decision 445 branches to "yes" branch 446 which loops back to predefined process 425 in order to analyze the next result for cardinality and process the data as described above. This looping continues until all of the results in raw results 420 have been processed, at which point decision 445 branches to "no" branch 448. As described above, the process is an iterative, recursive process that can repeat as long as needed. A determination is made as to whether to continue iterating the process (decision 450). If continuation of the process is desired, then decision 450 branches to "yes" branch 452 which loop back to receive the next search terms from the entity extractor, described below. This looping continues until iteration is no longer desired, at which point decision 450 branches to "no" branch 454 and processing ends at 455.

Figure 5:
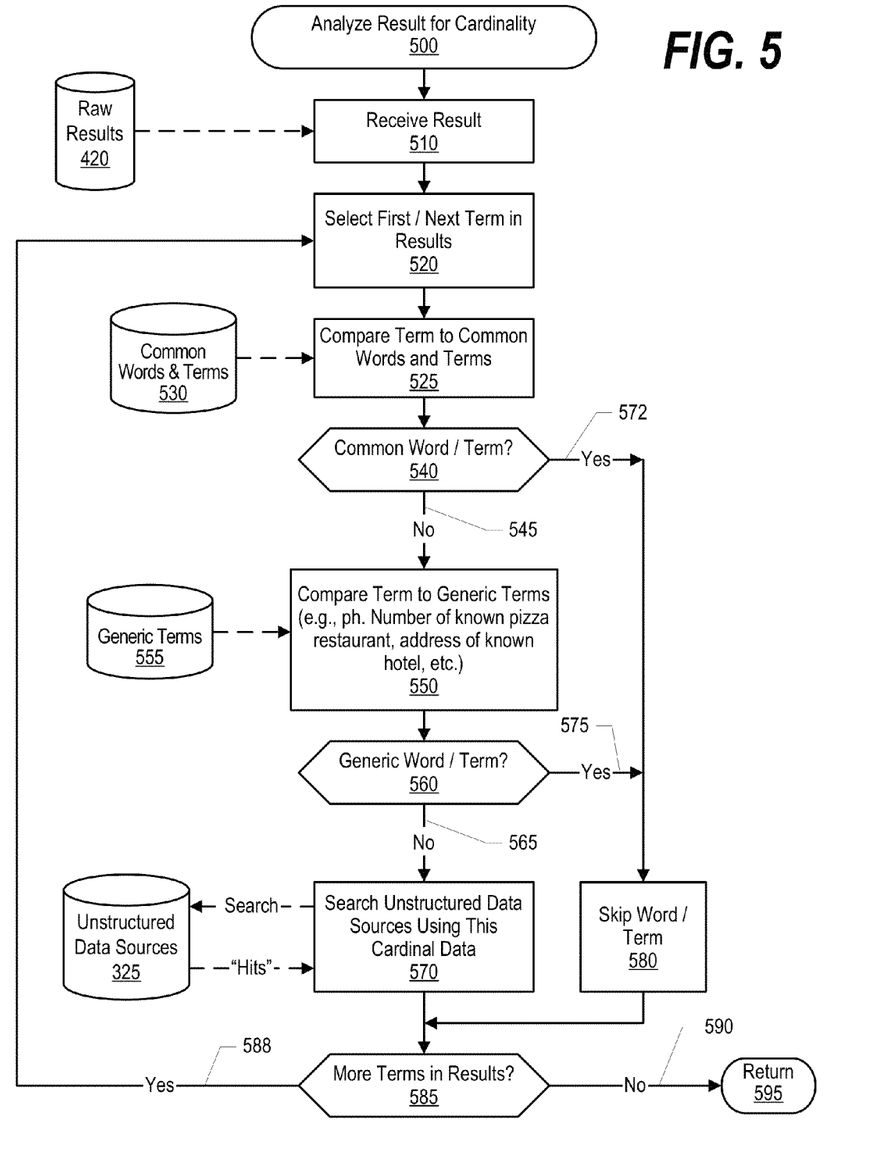
FIG. 5 is a flowchart showing steps by the entity resolver to analyze structured results for cardinality.

Entity extractor process is shown commencing at 460 whereupon, at step 465, the entity extractor receives search hits resulting from a search of unstructured data sources with the resulting data being determined to be cardinal data. In other words, common terms and generic data, as described in FIG. 5, are not passed to the entity extractor for further processing. Rather, non-common terms that are also non-generic that were found in the unstructured data sources are sent as search "hits" for processing by the entity extractor.

At step 470, the entity extractor, which may be a commercially available tool that performs entity extraction, extracts the entities (e.g., possible field names and other metadata that possibly relates to a piece of data (term) found in a the search hits). A determination is made as to whether entities, such as phone numbers, credit card numbers, addresses, etc., were able to be extracted from the search hits (decision 475). If entities were extracted from the search hits, then decision 475 branches to "yes" branch 478 whereupon the extracted entities are processed by the entity resolver process starting at 400 as described above. On the other hand, if no entities were extracted, then decision 475 branches to "no" branch 482 bypassing step 480. At step 485, the entity extractor waits for the next entity extraction request to arrive, at which point step 485 loops back to step 465 in order to process the next entity extraction request.

FIG. 5 is a flowchart showing steps by the entity resolver to analyze structured results for cardinality. Processing commences at 500 whereupon, at step 510, a result is retrieved from raw results data store 420. As described in FIG. 4, raw results data store 420 is where results are stored when the entity resolver performed entity relationship resolution on data from structured data sources. At step 520, the first term (e.g., data item) in the received results is selected. At step 525, this term is compared to common words and terms found in data store 530.

A determination is made as to whether the selected term is a common term (decision 540). An example of a common term would be most words found in a spelling book or traditional dictionary. An example of a non-common term would be a person's name, a phone number, the name of an organization, or the like, that is not generally found in a traditional dictionary. If the term is a non-common term, then decision 540 branches to "no" branch 545 whereupon, at step 550, the term is compared to generic terms in order to identify whether, even though the term is non-common, it is generic or non-generic. This is performed by checking generic terms data store 555. Examples of generic terms might be phone numbers or addresses of businesses or other organizations that are known by many members of the public. For example, the phone number of a local pizza establishment might be considered a generic term. Common terms and generic terms are generally not helpful to search unstructured data as they will return an inordinate number of rather meaningless hits. A determination is made as to whether the term is a generic term (decision 560). If the term is a non-generic term, then decision 560 branches to "no" branch 565 whereupon, at step 570, the term (now known as being non-common and non-generic) is searched against unstructured data sources 325. The non-common, non-generic terms are used as search parameters and the search engine returns search results, or "hits," such as documents or web pages where the search term was found.

Returning to decisions 540 and 560, if the term was found to be common or generic, then decisions 540 and 560 branch to "yes" branch 572 and 575, respectively, bypassing step 570. As noted in block 580, if the term is found to be either common or generic, then the term is skipped and not searched using the unstructured data sources.

A determination is made as to whether there are more terms in the raw results data store to process (decision 585). If there are more terms in the raw results to process, then decision 585 branches to "yes" branch 588 which loops back to select and process the next term in the raw results data store. This looping continues until all of the results in the raw results data store have been processed whereupon decision 585 branches to "no" branch 590 and processing returns to the calling process (see FIG. 4) at 595.

For an example implementation in a law enforcement embodiment using the processing described above, an arrest record is created and processed. First, the arrest record is logged into a structural system (an example of a backend system) where structured data sources are maintained regarding arrests and other police activity. In this example, the suspect is named "Max Dobson" with a date of birth being Jun. 7, 1980 a given social security number, and a vehicle plate number of CT/234AS8. Unstructured searches are performed based on the cardinality analysis for the various terms. In this example, assume the unstructured searches for the Name entity and the DOB/SSN entities return no hits. However, the search of unstructured data sources using the vehicle plate number retrieves a particular incident report (a document "hit"). Entity extraction performed by the entity extractor process extracts an address of "123 Main Street, Staten Island, N.Y.". Returning this extracted address to the entity resolver process allows the entity resolver to query structured data sources that include a visa entry record indicating that this address was used as the destination of an incoming international passenger named "Maxim Dobrovski" with a DOB of Jun. 7, 1980 and a passport number of #238208 (Ukraine). The structured data sources also note that this suspect is on a separate watchlist (a different structured data source in the entity resolver) for dealing in high-end stolen vehicles. The ultimate data (real name of person on watchlist, other entity information, and related "hits" from unstructured data sources are stored in the results data store for analysis. Now, the law enforcement personnel have much more related data for the arrested suspect rather than the few pieces of data gathered during the arrest itself. This richness of data, stored in the results data store, is a result of the entity resolver and entity extractor working in concert to recursively extract data from both structured and unstructured data sources.

One of the implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   searching a first set of one or more unstructured data sources on one or more initial search terms using a search engine;
   receiving one or more search hits from the searching of the first set of unstructured data sources;
   retrieving one or more terms from the search hits;
   extracting one or more entities from the search hits corresponding to the retrieved one or more terms;
   automatically constructing one or more structured queries using the one or more extracted entities as one or more fields and the corresponding one or more terms as one or more search parameters within the fields;
   querying one or more structured data sources using the one or more structured queries;
   receiving one or more query results from the querying;
   analyzing the one or more query results based on cardinality of the query results, wherein the analyzing further comprises comparing each of the one or more query results to a common terms data store and a generic terms data store, and determining that a selected query result from the one or more query results is a non-common, non-generic term;
   searching a second set of one or more unstructured data sources using the selected query result as a search term using the search engine; and
   recording the one or more search hits and the one or more extracted entities in a results data store.

2. The method of claim 1 further comprising:
   recording one or more search hits that result from performing the searching of the second set of one or more unstructured data sources in the results data store.

3. The method of claim 1 further comprising:
performing an entity relationship resolution analysis on the one or more query results.

4. The method of claim 3 further comprising:
storing results of the entity relationship resolution analysis in a raw results data store, wherein the analysis based on cardinality is performed on each of the results in the raw results data store.

5. The method of claim 1 further comprising:
determining that one or more of the query results are common terms by comparing each of the query results against the common terms data store;
skipping each of the query results that are determined to be common terms;
processing the query results that are determined to be non-common terms, the processing including determining that one or more of the non-common terms are generic terms by comparing each of the non-common terms to the generic terms data store;
skipping each of the query results that are determined to be generic terms; and
searching each of the query results that are determined to be both non-common and non-generic terms using the second set of one or more unstructured data sources by utilizing the search engine.

6. The method of claim 5 wherein the generic terms include identification data pertaining to one or more known businesses.

7. An information handling system comprising:
one or more processors;
a memory accessible by at least one of the processors;
a nonvolatile storage medium accessible by at least one of the processors;
a set of instructions stored in the memory and executed by at least one of the processors in order to perform actions of:
searching a first set of one or more unstructured data sources on one or more initial search terms using a search engine;
receiving one or more search hits from the searching of the first set of unstructured data sources;
retrieving one or more terms from the search hits;
extracting one or more entities from the search hits corresponding to the retrieved one or more terms;
automatically constructing one or more structured queries using the one or more extracted entities as one or more fields and the corresponding one or more terms as one or more search parameters within the fields;
querying one or more structured data sources using the one or more structured queries;
receiving one or more query results from the querying;
analyzing the one or more query results based on cardinality of the query results, wherein the analyzing further comprises comparing each of the one or more query results to a common terms data store and a generic terms data store, and determining that a selected query result from the one or more query results is a non-common, non-generic term;
searching a second set of one or more unstructured data sources using the selected query result as a search term using the search engine; and
recording the one or more search hits and the one or more extracted entities in a results data store.

8. The information handling system of claim 7 wherein the actions further comprise:
recording one or more search hits that result from performing the searching of the second set of one or more unstructured data sources in the results data store.

9. The information handling system of claim 7 wherein the actions further comprise:
performing an entity relationship resolution analysis on the one or more query results.

10. The information handling system of claim 9 wherein the actions further comprise:
storing results of the entity relationship resolution analysis in a raw results data store, wherein the analysis based on cardinality is performed on each of the results in the raw results data store.

11. The information handling system of claim 7 wherein the actions further comprise:
determining that one or more of the query results are common terms by comparing each of the query results against the common terms data store;
skipping each of the query results that are determined to be common terms;
processing the query results that are determined to be non-common terms, the processing including determining that one or more of the non-common terms are generic terms by comparing each of the non-common terms to the generic terms data store;
skipping each of the query results that are determined to be generic terms; and
searching each of the query results that are determined to be both non-common and non-generic terms using the second set of one or more unstructured data sources by utilizing the search engine.

12. A computer program product stored in a computer readable memory device, comprising functional descriptive material that, when executed by an information handling system, causes the information handling system to perform actions comprising:
searching a first set of one or more unstructured data sources on one or more initial search terms using a search engine;
receiving one or more search hits from the searching of the first set of unstructured data sources;
retrieving one or more terms from the search hits;
extracting one or more entities from the search hits corresponding to the retrieved one or more terms;
automatically constructing one or more structured queries using the one or more extracted entities as one or more fields and the corresponding one or more terms as one or more search parameters within the fields;
querying one or more structured data sources using the one or more structured queries;
receiving one or more query results from the querying;
analyzing the one or more query results based on cardinality of the query results, wherein the analyzing further comprises comparing each of the one or more query results to a common terms data store and a generic terms data store, and determining that a selected query result from the one or more query results is a non-common, non-generic term;
searching a second set of one or more unstructured data sources using the selected query as a search term using the search engine; and
recording the one or more search hits and the one or more extracted entities in a results data store.

13. The computer program product of claim 12 wherein the actions further comprise:

recording one or more search hits that result from performing the searching of the second set of one or more unstructured data sources in the results data store.

14. The computer program product of claim 12 wherein the actions further comprise:

performing an entity relationship resolution analysis on the one or more query results.

15. The computer program product of claim 14 wherein the actions further comprise:

storing results of the entity relationship resolution analysis in a raw results data store, wherein the analysis based on cardinality is performed on each of the results in the raw results data store.

16. The computer program product of claim 12 wherein the actions further comprise:

determining that one or more of the query results are common terms by comparing each of the query results against the common terms data store;

skipping each of the query results that are determined to be common terms;

processing the query results that are determined to be non-common terms, the processing including determining that one or more of the non-common terms are generic terms by comparing each of the non-common terms to the generic terms data store;

skipping each of the query results that are determined to be generic terms; and searching each of the query results that are determined to be both non-common and non-generic terms using the second set of one or more unstructured data sources by utilizing the search engine.

17. The computer program product of claim 16 wherein the generic terms include identification data pertaining to one or more known businesses.

\* \* \* \* \*